(12) United States Patent
Duits et al.

(10) Patent No.: US 7,207,411 B2
(45) Date of Patent: Apr. 24, 2007

(54) STEER UNIT FOR STEER-BY-WIRE

(75) Inventors: Johannes Adrianus Maria Duits, Bodegraven (NL); Andreas Clemens Van Der Ham, Leiderdorp (NL); Johannes Haaye Van Der Kamp, Tilburg (NL); Klemens Schmidt, Gerbrunn (DE)

(73) Assignee: AB SKF, Gothenburg (SE)

( * ) Notice: Subject to any disclaimer, the term of this patent is extended or adjusted under 35 U.S.C. 154(b) by 9 days.

(21) Appl. No.: 10/484,771

(22) PCT Filed: Jul. 25, 2002

(86) PCT No.: PCT/NL02/00505

§ 371 (c)(1),
(2), (4) Date: Aug. 11, 2004

(87) PCT Pub. No.: WO03/010040

PCT Pub. Date: Feb. 6, 2003

(65) Prior Publication Data

US 2004/0262071 A1     Dec. 30, 2004

(30) Foreign Application Priority Data

Jul. 25, 2001   (NL) .................................. 1018627

(51) Int. Cl.
*B62D 5/04*     (2006.01)
(52) U.S. Cl. ..................... 180/402; 180/403; 701/41
(58) Field of Classification Search ............... 180/402, 180/403, 421, 422; 701/41–43
See application file for complete search history.

(56) References Cited

U.S. PATENT DOCUMENTS

| 4,771,846 A | | 9/1988 | Venable et al. |
| 5,097,917 A | * | 3/1992 | Serizawa et al. ........... 180/402 |
| 5,908,457 A | * | 6/1999 | Higashira et al. ............. 701/41 |
| 6,000,490 A | * | 12/1999 | Easton ....................... 180/402 |

(Continued)

FOREIGN PATENT DOCUMENTS

EP     1 125 825     8/2001

OTHER PUBLICATIONS

Patent Abstracts of Japan, vol. 1998, No. 14, Dec. 31, 1998 -& JP 10 236324 A (Toyota Autom Loom Works Ltd), Sep. 8, 1998.

*Primary Examiner*—Lesley D. Morris
*Assistant Examiner*—L. Lum
(74) *Attorney, Agent, or Firm*—Young & Thompson

(57) ABSTRACT

Steer unit for steer-by-wire comprising angle sensing means (12) for detecting the angular position of a steering wheel (11), processing means (10) connected to the angle sensing means (12) and connectable to a wheel position sensor (22), the wheel position sensor (22) being arranged for providing an output signal representing the position of steered wheels (20) of a vehicle. The processing means (10) are connectable to a steering actuator (21) mechanically coupled to the steered wheels (20), the processing means (10) being arranged for driving the steering actuator (21) dependent on the angular position of the steering wheel (11). The steer unit further comprises friction means (14) for providing a friction force on the steering wheel (11), the friction means (14) being connected to the processing means (10), and the processing means (10) being arranged for driving the friction means (14) in dependence of the wheel position sensor output signal.

23 Claims, 3 Drawing Sheets

U.S. PATENT DOCUMENTS

| | | | | |
|---|---|---|---|---|
| 6,041,882 | A * | 3/2000 | Bohner et al. | 180/402 |
| 6,079,513 | A * | 6/2000 | Nishizaki et al. | 180/402 |
| 6,138,788 | A * | 10/2000 | Bohner et al. | 180/405 |
| 6,213,248 | B1 * | 4/2001 | Kawaguchi et al. | 180/446 |
| 6,269,903 | B1 * | 8/2001 | Bohner et al. | 180/406 |
| 6,481,526 | B1 * | 11/2002 | Millsap et al. | 180/402 |
| 6,550,565 | B2 * | 4/2003 | Thomas et al. | 180/402 |
| 6,612,392 | B2 * | 9/2003 | Park et al. | 180/402 |
| 6,640,923 | B1 * | 11/2003 | Dominke et al. | 701/41 |
| 6,687,588 | B2 * | 2/2004 | Demerly et al. | 701/41 |
| 2001/0032749 | A1 | 10/2001 | Cymbal et al. | |

* cited by examiner

STEER UNIT FOR STEER-BY-WIRE

The present application relates to a steer unit for steer-by-wire applications in vehicles, such as fork lift trucks. In a steer-by-wire system, there is no direct mechanical link between the steering wheel (operated by the driver) and the actuator of the (steered) wheels. More specifically, the present invention relates to a 1. Steer unit for steer-by-wire comprising angle sensing means for detecting the angular position of a steering wheel; processing means connected to the angle sensing means and connectable to a wheel position sensor, the wheel position sensor being arranged for providing an output signal representing the position of steered wheels of a vehicle; the processing means being connectable to a steering actuator mechanically coupled to the steered wheels, the processing means being arranged for driving the steering actuator dependent on the angular position of the steering wheel, the steer unit further comprising friction means for providing a friction force on the steering wheel, the friction means being connected to the processing means, and the processing means being arranged for driving the friction means in dependence of the wheel position sensor output signal.

The steer unit provides a very cost-effective solution for providing an artificial feel to a driver operating a steering wheel of a vehicle, in particular when used in a fork lift truck. In usual front wheel steering vehicles, the electric brake is a very cost-effective solution to provide an artificial feeling to the driver. In fork lift trucks the steered wheels will not go back to the centre position after steering (this would even be an unwanted effect), and for this application the present invention is particularly suited.

German patent application DE-A-198 34 868 discloses a steering wheel regulating unit for steer-by-wire applications in motor vehicles. It comprises angle sensing means for sensing the rotary movement of a steering wheel. Feedback to the driver is provided by two redundant electric motors. The regulating unit may be connected to an-actuator for driving the steered wheels of the motor vehicle.

A disadvantage of this regulating unit is, that it requires an electric motor to provide an artificial feel to the driver (feed-back). This is being caused by the self-aligning effect of motor vehicles of which the front wheels are being steered, and thus requires an electric motor to drive the steering wheel.

The U.S. Pat. No. 4,771,846 describes a steering unit as defined in the preamble, in which the-processing means are arranged to drive the friction means in dependence of a wheel position sensor output signal. The system provides an artificial steering feel to the driver in a steering system that does not have a mechanical connection between the steering wheel and the steerable wheels. The system further provides mechanical end-stops, defining the maximum rotation of the steering wheel in each steering direction.

The present invention seeks to provide a steer unit for use in a steer-by-wire application, which provides end-stops to the steering system that are easier to implement and are more cost-efficient.

According to the present invention, a steer unit is provided of the type defined in the preamble, in which the processing means are arranged to energise the friction means at end-stops.

The end-stops may correspond to the mechanical limits of the steering actuator, or the processing means may be arranged to determine the end-stops based on at least one vehicle parameter. The at least one parameter is one or more of the group of vehicle speed, load, load height, etc. This enables to provide a variable end-stop for a steering wheel, based on various parameters. This allows a very flexible virtual end-stop system, which can take into account numerous situations. Especially for fork lift trucks, the inclusion of load and load height will lead to a much safer operation of the vehicle, as the virtual end-stops prevent the driver from making too sharp turns, as the virtual end stops will limit the driver from steering further. In this way feedback of the position of the steered wheel is given to the operator. This will improve the response of the steering control and will improve the safety.

In a further embodiment, the processing means are arranged to gradually increase the friction on the steering wheel when approaching an end-stop. This will alert a driver that he is approaching a possibly dangerous situation, or at least that he approaches the present steering limits of his vehicle.

Also, in a further embodiment, the processing means are arranged to drive the friction means to exert a higher friction force when the steering wheel rotates in a first direction as compared to when the steering wheel rotates in a direction opposite to the first direction. In this embodiment, the driver will feel a larger friction force on the steering wheel when turning into a curve and a lower friction force when turning out of the curve.

The processing means may be arranged to increase the friction on the steering wheel when the rotation rate of the steering wheel, as determined from the angle sensing means, is greater than the corresponding maximum rotation rate of the steering actuator. This will prevent that the driver gives too large inputs to the steer-by-wire system and will prevent the problem that the actuation of the steered wheels lags behind the rotation of the steering wheel. It is also possible to control the friction on the steering wheel in the above manner on basis of the angle error between steering wheel and steered wheel.

In an even further embodiment, the processing means are arranged to adapt the ratio between steer wheel rotation and steered wheel rotation. This allows to vary the relationship between the absolute angular position of the steering wheel and the absolute angular position of the steered wheels. This embodiment also allows to recover the middle position of the steering wheel in correspondence with the middle position of the steered wheels (the vehicle driving straight).

According to a further embodiment, the friction means engage a first part of the steering wheel, and the steering wheel comprises a flexible coupling to the first part. The processing means are arranged to release the friction means when a change of direction of the steering wheel is detected from the angular sensing means signal. When the friction means are engaged (high friction force on steering wheel) the flexible coupling allows the driver to turn the steering wheel away from the end-stop, which may be detected by the angular sensing means. Upon detection of such an event, the processing means can then disengage the friction means. The flexible coupling may be provided e.g., by providing a long and thin steering wheel shaft of an elastic material, or other implementations using elastic elements, such as puffers attached to the steering wheel shaft or friction means. However, the same effect may also be achieved by simply providing some clearance or space for motion. In a further embodiment, the steer unit further comprises a detection element for detecting torque force on the steering wheel shaft, the detection element being connected to the processing means. In that case, the processing means may be arranged to reduce friction on the steering wheel shaft when the detected torque force on the steering wheel changes direction. This allows to quickly release the friction force on the steering wheel when the driver wants to turn the steered wheels in the opposite direction.

In a still further embodiment, the steer unit further comprises at least one wheel torque sensor detecting an external torque on the wheels of the vehicle, the at least one wheel torque sensor being connected to the processing means. In this case, the processing means may be further arranged for driving the friction means in dependence of the wheel torque sensor output. This allows to give the driver an actual feedback of the external forces on the steered wheels, e.g. when the steered wheels hit a curb stone.

The friction means may comprise an electrically controlled brake in an embodiment of the present invention, such as an electromagnetic brake, an electrorheological or magnetorheological fluid brake. An electrorheological or magnetorheological fluid brake comprises a fluid of which the viscosity is controlled using electric and magnetic signals, respectively. The electromagnetic brake may e.g. comprise a disc attached to a shaft of the steering wheel and at least one electromagnetic coil positioned substantially in parallel to the disc, the electromagnetic coil being connected to the processing means. This provides a very cost-effective implementation of the friction means. In a further embodiment, the disc is attached to the shaft of the steering wheel by means of a flexible coupling. This will prevent a sudden blockage of the steering wheel, and allow the driver to move the steering wheel a bit, which is more comfortable. This also will improve the operation of the torque sensor on the steering wheel.

In an even further embodiment of the present invention, the friction means comprise mechanical blocking means. These may be implemented in a cost-effective manner, and provide the functionality of variable end-stops for a steer-by-wire system. The mechanical blocking means may in an embodiment comprise a disc attached to the steering wheel shaft, the disc being provided with at least one saw tooth profile at its perimeter, and a blocking member which is controllable by an actuator between a blocking position and an idle position. By providing a double opposite saw tooth profile on the disc, the friction means are operable in both steering directions. In an even further embodiment, the actuator may comprise a sensor for sensing motion of the blocking member. This allows a very simple and cost-effective detection of a counter-steering action of a driver. When the blocking means are engaged when approaching an end-stop, the saw tooth profile allows a movement of the steering wheel in the opposite direction, which may be detected using various means.

In an alternative embodiment, the mechanical blocking means comprise a disc attached to the steering wheel shaft, the disc being provided with semi-spherical indentations at its perimeter, and a blocking member which is moveable between a first position in which the blocking member engages the spherical indentation and a second position in which the disc can rotate freely.

The present invention will now be explained in further detail using a number of exemplary embodiments, with reference to the attached drawing, in which FIG. 1 shows a schematic diagram of a steering arrangement for use in steer-by-wire applications according to an embodiment of the present invention; and FIG. 2 shows a sectional view of a steering unit for use in an embodiment of the present invention;

FIG. 4b shows a top view of the embodiment of FIG. 4a; and

Figure 1:
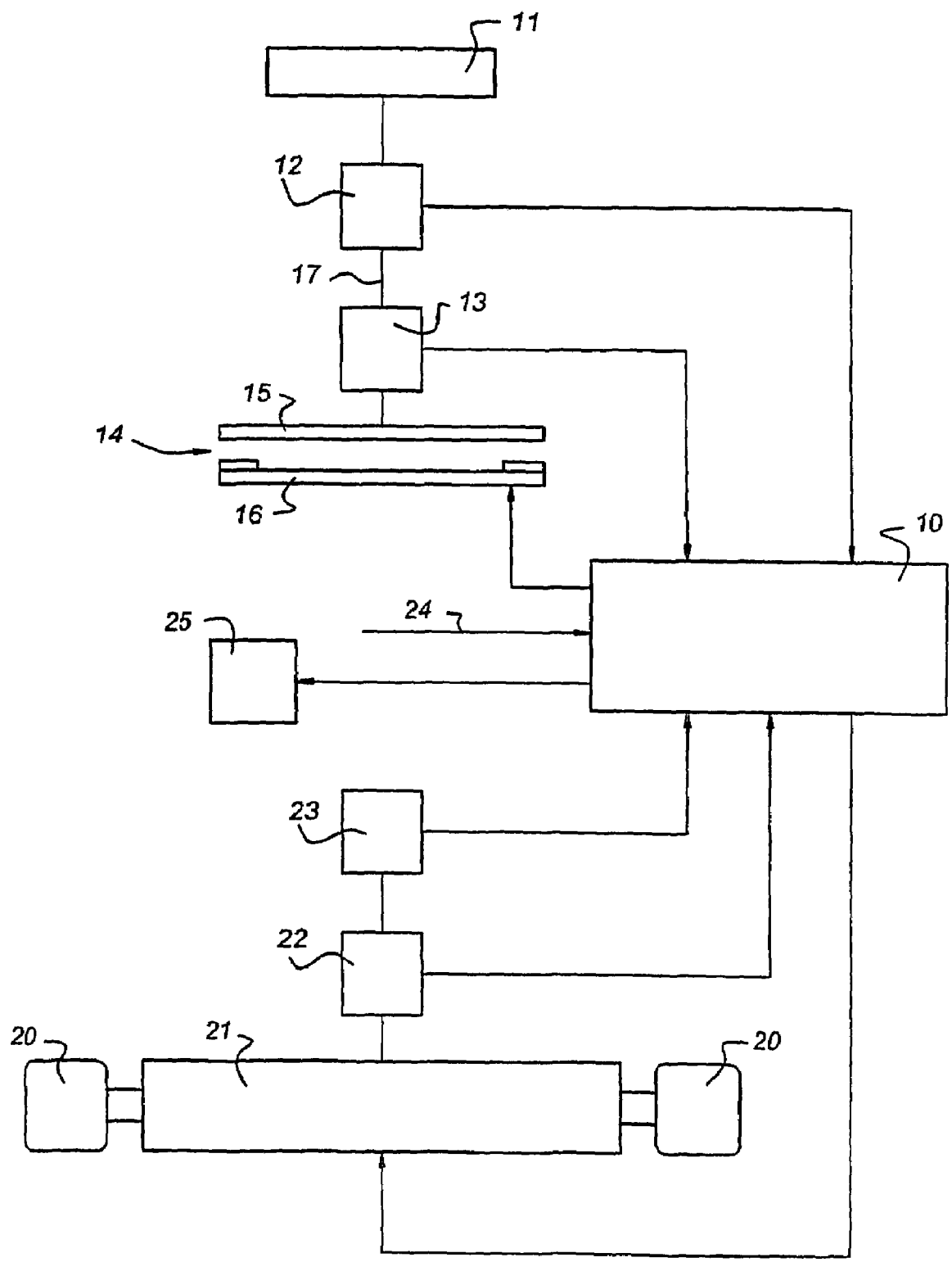

FIG. 1 shows a schematic diagram of a steering arrangement for use in steer-by-wire technology applications. The processing means or controller 10 is the main unit of the steering arrangement, receiving various input signals and controlling a number of further devices. The operator of the vehicle controls the position of the steered wheels 20 of the vehicle using a steer wheel 11. The angular position of the steered wheels 20 is controlled by an actuator 21, which may be a hydraulic actuator or an electrically or mechanically driven actuator.

The angular position of the (shaft 17 of the) steer wheel 11 is detected by angle sensing means, such as angular sensor 12, which is connected to the controller 10. For certain applications, the angular sensor 12 may be of the incremental type. i.e. the output signal is proportional to the angular displacement. However, for more sophisticated functions, such as described below, the angular sensor 12 should output a signal which is related to the absolute position of the steer wheel 11, for a single turn ($2\pi$) or multi-turn (such as +/-3 turns). With an absolute angle sensor 12, the steer angle of the steering wheel 11 is directly related to the driving direction (steer angle of the steered wheels). When redundancy requires, the angular sensor 12 may comprise two sensors.

Also, the torque exerted on the steer wheel 11 is measured by an optional torque sensor 13, and input to the controller 10. The controller 10 also receives input signals from a wheel angle sensor 22, which measures the actual angular position of the steered wheels 20 of the vehicle. As shown in FIG. 1, this may be accomplished indirectly by sensing the position of (an element of) the actuator 21. Alternatively, the wheel angle sensor 22 may be mounted with the steered wheels 20, e.g. integrated in the King pin assembly.

Furthermore, the controller 10 may receive a speed signal 24 representing the vehicle speed. Also, the controller 10 may be connected to an emergency brake 25, e.g. an electromagnetic brake system, allowing to make emergency stops.

In a further embodiment, the steering arrangement may be further provided with a wheel torque sensor 23, which may provide a signal to the controller 10 representing the torque exerted by the steered wheels 20 on the actuator 21, i.e. a signal proportional to the externally applied torque on the steered wheels 20. This may e.g. be caused by too high a speed for a certain turning radius of the vehicle.

As shown in FIG. 1, the steering arrangement further comprises friction means 14, to enable to give the driver an artificial steering feeling when operating the steering wheel 11. In the embodiment shown, the friction means 14 comprise an electromagnetic brake. The electromagnetic brake may comprise a disc 15, fixedly attached to the shaft 17 of the steering wheel 11 and preferably made from high permeable magnetic material. In parallel to the metal disc 15 a stator 16 is positioned comprising a number of electromagnetic coils. By energising the electromagnetic coils on the stator 16, a friction force is generated for the steering wheel 11, i.e. the driver of the vehicle must apply more effort to the steering wheel 11 to turn it. By varying the strength of the drive signal to the coils on the stator 16, a varying friction force may be generated.

The steering arrangement described above may be used effectively to provide (virtual) end-stops for the steering wheel 11, by energising the coils on the stator 16 above a certain threshold. This may be done in a number of ways.

Firstly, the controller 10 may receive the angular position signal from the actuator 21 and sense when the actuator 21 (and from this the steered wheels 20) are in either one of their extreme positions, as determined by mechanical limitations. At the extreme points, the controller 10 energises the coils on the stator 16 above the threshold, effectively blocking a further turning of the steering wheel 11 (effectively providing end-stops).

Also, the controller 10 might determine a virtual end-stop at any further angular position of the steered wheels 20, at which position the steering wheel 11 may not be turned any further in the same direction. The virtual end-stop may e.g. be controlled in dependence of the vehicle speed signal 24, effectively establishing a maximum turning radius of the vehicle depending on the vehicle speed. Apart from the speed signal 24, other signals may be input to the controller 10 to establish the virtual end-stops, such as the load weight or load height of a fork lift truck. The controller 10 may e.g. use a model of the vehicle (or fork lift truck) to establish the virtual end-stops based on a number of input parameters (speed, load, load height, etc.).

Besides providing (virtual) end-stops, the controller 10 may also be arranged to gradually increase the friction of the friction means 14 when approaching a (virtual) end-stop. The approach of a (virtual) end-stop may be determined from the signal from the wheel angle sensor 22. The driver will then feel that he is approaching the end of the turning capabilities of the vehicle. In the same manner, an artificial feel may be given to the driver by applying a higher friction force on the shaft 17 of the steering wheel 11 when turning in to a curve and a lower friction force when turning out of a curve.

The friction force applied by the friction means 14 may also be increased when the controller 10 senses that the turning speed of the steering wheel 11 is greater than the (physically limited) maximum angular speed of the actuator 21. The turning speed of the steering wheel 11 may be determined by the controller 10 from the signal from the angular sensor 12.

The torque sensor 13 provides a signal representing the torque exerted by the driver on the steering wheel 11. When the driver starts a curve and the friction means 14 apply a friction force on the steering wheel 11, a torque will be sensed by the torque sensor 13 in a first direction. When the driver wants to steer back, the friction means 14 will still be exerting a friction force. Once the torque sensor 13 gives a signal to the controller 10 representing a torque in the opposite direction (indicating that the driver wants to steer back), the controller will release the friction means 14 or lower the friction force applied.

The present invention also allows to shift the middle position of the steering wheel 11. As there is no direct mechanical coupling between the steering wheel 11 and the steered wheels 20, situations may arise, where the steered wheels 20 are not in a neutral angular position (the vehicle driving straight forward) when the steering wheel 11 is in a neutral position. This may be a uncomfortable situation for the driver of the vehicle. The present invention allows to shift the middle position of the steering wheel 11, e.g. by adapting the sensitivity (the ratio of turn angle of steering wheel 11 and turn angle of the steered wheels 20) in the controller 10.

The controller 10 may further be arranged to provide an even more realistic artificial feel to the driver through the steering wheel 11 by using the signal from the wheel torque sensor 23. When an external force is exerted on the steered wheels 20 of the vehicle, the sensed signal is input to the controller 10, which may then adapt the friction force of the friction means 14. This may e.g. give a sensory indication to the driver through the reaction of the steering wheel 11 when the vehicle hits a curb stone.

Furthermore, the controller 10 may provide a safety check function. The controller 10 may check whether all components (sensors, actuators) are functioning properly. The controller 10 may in a further embodiment be provided with an interface for connection to an available vehicle control system, such as a CAN-bus interface. Via the CAN-bus interface a number of parameters (actual steering angle, alarms, status, etc.) may be communicated to the vehicle control system or other components in the vehicle.

In an embodiment, the wheel angle sensor 22 may be integrated in the King-pin assembly for providing an accurate steering angle signal to the controller 10. The controller 10 may then be arranged to determine the maximum speed associated with the detected steering angle, e.g. using a model of the vehicle. When the vehicle is a fork lift truck, the model might incorporate the weight of the vehicle, but also the load weight and the load position. In an even further embodiment, the maximum calculated (allowable) speed is used to control the actual speed of the vehicle (effectively slowing down the vehicle when the actual turning rate becomes too high).

Figure 2:
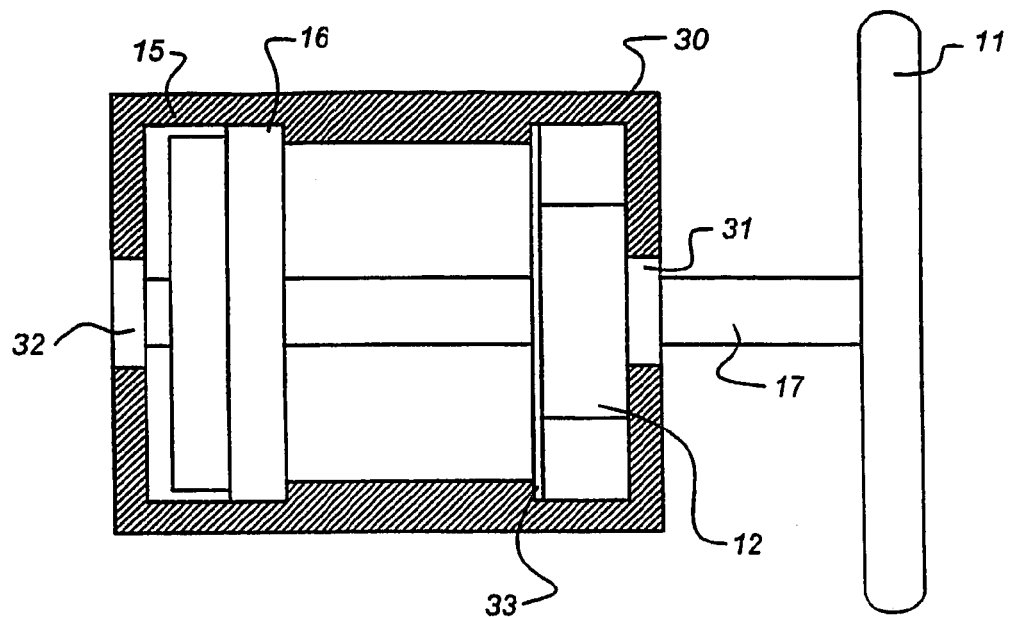

In a further embodiment of the present invention, as shown in FIG. 2, the friction means comprise a disc 15, which is flexibly coupled to the shaft 17 of the steering wheel 11. The steering wheel part of this embodiment is shown in FIG. 2. FIG. 2 shows a steering wheel unit having a housing 30, in which the shaft 17 of the steering wheel 11 is mounted using two bearings 31, 32. In the front part of the housing, the angular sensor 12 is positioned as well as an optional electronic circuit board 33 for (pre-)processing the angular sensor signal. The stator 16 of the friction means 14 is fixedly mounted to the housing 30. In this embodiment, the disc 15 (see above) is coupled to the steering wheel shaft 17 by means of a flexible coupling, such as a rubber molding. This allows a more natural feeling for the driver operating the steering wheel 11, as a sudden blockage of the steering wheel 11 is prevented. The flexible coupling allows the steering wheel to be moved a little bit, even when the friction means 14 apply a very large force on the disc 15. This embodiment also provides better possibilities to use a simpler type of torque sensor 13.

Optionally, the controller 10 is also integrated in the steering wheel unit. The controller 10 may be implemented as a microprocessor based control unit including memory, and may e.g. be included on the electronic circuit board 33. This allows for a highly integrated steering wheel unit, which allows easy assembly of e.g. a fork-lift truck.

The actuator 21 may be an electro-hydraulic proportional valve, which allows to proportionally control the flow of hydraulic fluid to the actuation cylinder under control of the controller 10. In this case, the controller 10 may include a PWM driver to efficiently control the actuator 21.

Figure 3:
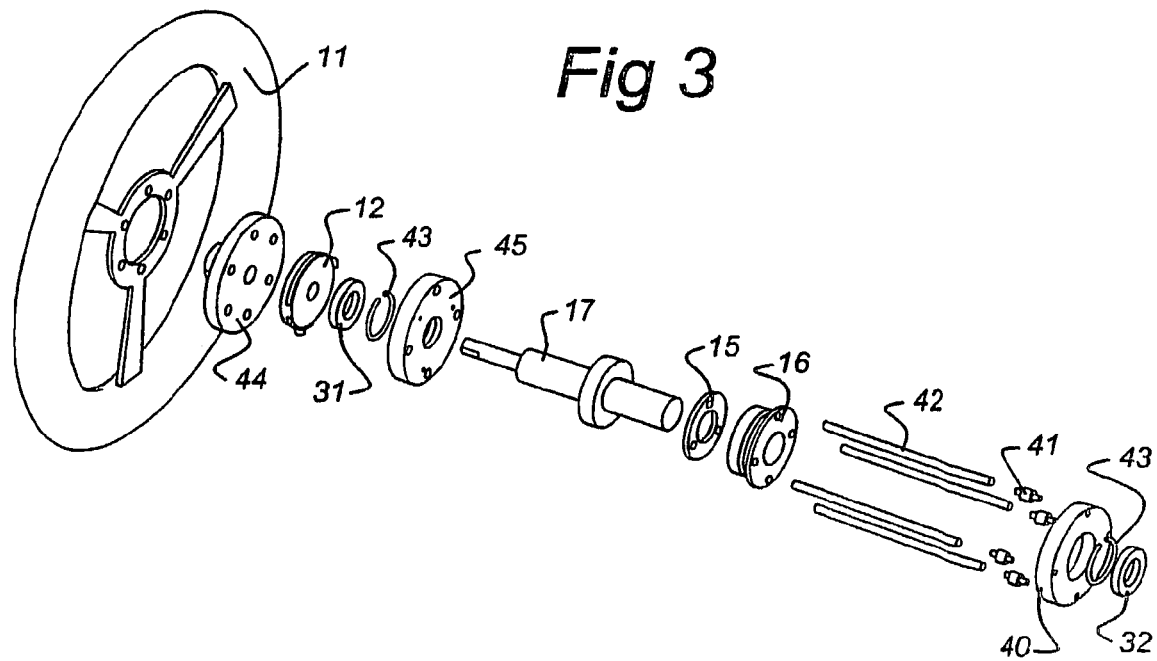
FIG. 3 shows an exploded view of a steering wheel unit according to a further embodiment of the present invention.

In FIG. 3, an exploded view is shown of the elements of a steering unit according to a further embodiment of the present invention. In this figure, elements with the same function as in the above described embodiments have the same reference numeral. The embodiment shown in FIG. 3 comprises a steering wheel 11, which in assembled state is attached to the steering wheel shaft 17 by means of a steer plate 44. The steering wheel shaft 17 is rotatably mounted using the front and aft bearing 31, 32, which are provided with a locking ring 43. The angular sensor 12 is mounted to sensor plate 45. Furthermore, the steering unit comprises a brake pad 15 and electromagnetic brake coil 16. The sensor plate 45 and brake plate 40 are fixedly coupled to each other using four pins 42, and may e.g. also be attached to a steering unit housing 30 (see FIG. 2). The brake pad 15 is fixedly attached to the steering wheel shaft 17, and the electromagnetic brake coil 16 is attached to the brake plate 40 (and thus to the fixed world) using a flexible coupling, which in the embodiment shown comprises four bearing dampeners 41. For the person skilled in the art it will be clear that a flexible coupling between the steering wheel 11 and the friction means 14 may also be provided in a number of other ways, such as providing a (partly) flexible steering wheel shaft 17. This may be accomplished by using a thing and long segment of spring steel as part of the steering wheel shaft 17, or by providing puffers in the steering wheel shaft 17 or mounting of the electromagnetic brake coil 16.

The steering unit of FIG. 3 may also be used in the arrangement shown in FIG. 1. When the actuator 21 reaches its end position, this will be sensed by the angular sensor 22 (e.g. a sensor in the King pin of one or both of the steered wheels). The controller 10 will sense this and energise the friction means 14 to a maximum value, thus blocking further movement of the steering wheel 11. When the driver turns the wheel in the other direction (which is made possible by the flexible coupling 41) the controller 10 will sense that signal from the angular sensor 12, which is an absolute encoder, changes sign. Once this event is detected, the controller 10 will drive the friction means 14 to release the electromagnetic brake coil 16.

Figure 4A:
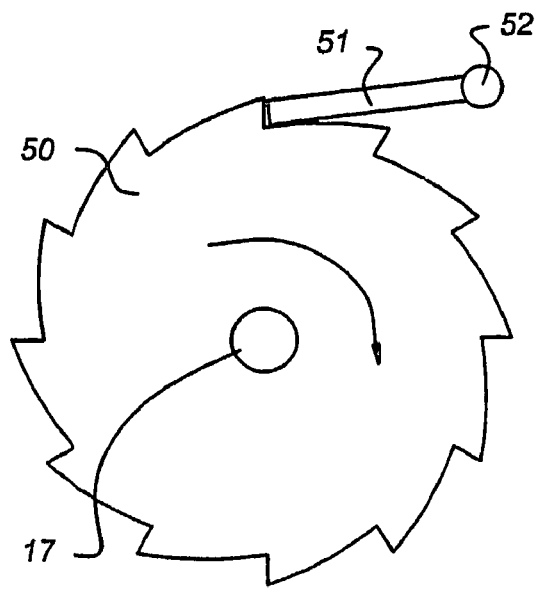
FIG. 4a shows a partial side view of a first embodiment of the mechanical blocking means.
Figure 4B:
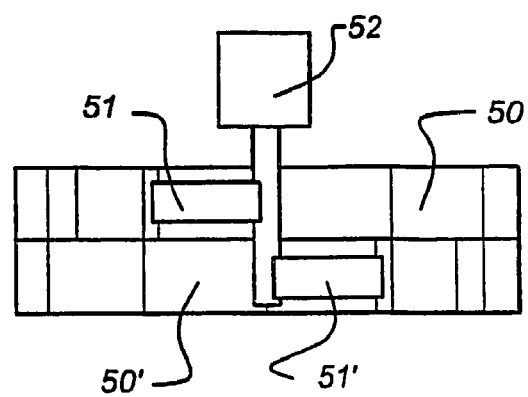

The friction means 14 of the above described embodiments of the present steering unit may also comprise mechanical blocking means. FIG. 4a and 4b show a partial side view and a top view of a first embodiment of the mechanical blocking means. A disc 50 is attached to the steering wheel shaft 17, the disc being provided with a saw tooth profile at its perimeter. A blocking member 51 is provided which can engage in the saw tooth profile of disc 50, effectively blocking rotation of the disc in the direction of the arrow. The blocking member may e.g. be rotated to a blocking position (as shown) and an idle position by an actuator 52. When two saw tooth profiles 50, 50' are provided on the perimeter of disc 50, as shown in FIG. 4b, the mechanical blocking means may be used to block rotation of the disc 50 in two directions by having two blocking members 51, 51', which have a fixed angle between them. The actuator 52 may then be operable between a first blocking position, an idle position and a second blocking position.

Returning to FIG. 4a, the disc 50 may rotate in a direction opposite to the direction indicated by the arrow when the blocking member 51 engages the saw tooth profile. Movement of the blocking member 51 may be sensed by a sensor, which preferably is integrated in the actuator 52 and connected to the controller 10. Once the controller 10 senses that an opposite steering motion is being made, it may drive the actuator 52 to put the blocking member 51 in its idle position again.

Figure 5:
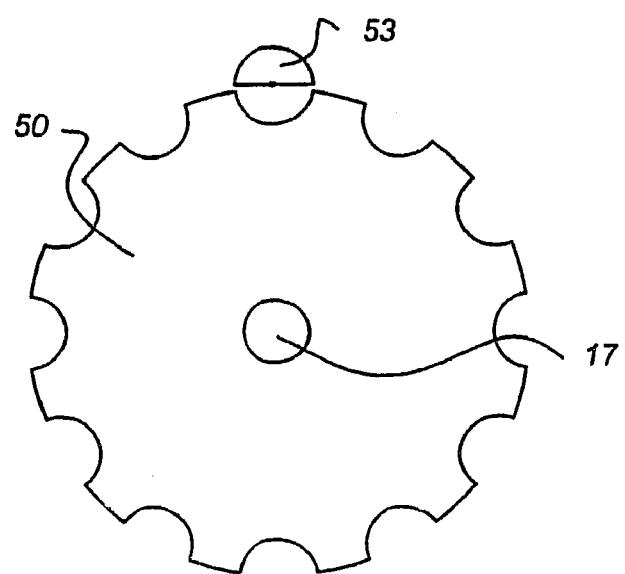
FIG. 5 shows a partial side view of a second embodiment of the mechanical blocking means.

FIG. 5 shows an alternative embodiment of the mechanical blocking means, in which the disc 50 is provided with a number of semi-spherical indentations. The blocking member 53 is then implemented as a semi-spherical rotatable member, which may engage the indentation in a blocking position and leaves the disc 50 free to rotate in an idle position. This allows to block rotation of the steering wheel shaft 17 in both directions.

The mechanical blocking means may be used in addition to the electromagnetic brake described above with reference to FIGS. 1, 2 and 3. In this case the functionality of providing steering feel by controlling the friction on steering wheel may be provided. In this case, the electromagnetic brake may be of a lighter type, as the blocking function at end-stops is provided by the mechanical blocking means.

The invention claimed is:

1. A steer unit for steer-by-wire comprising:
   angle sensing means (12) for detecting an angular position of a steering wheel (11);
   processing means (10) connected to the angle sensing means (12) and connectable to a wheel position sensor (22),
   the wheel position sensor (22) being arranged for providing an output signal representing the angular position of steered wheels (20) of a vehicle,
   the processing means (10) being connectable to a steering actuator (21) mechanically coupled to the steered wheels (20),
   the processing means (10) being arranged for driving the steering actuator (21) dependent on the angular position of the steering wheel (11);
   friction means (14) for providing a friction force on the steering wheel (11),
   the friction means (14) being connected to the processing means (10),
   the processing means (10) being arranged for driving the friction means (14) in dependence of the wheel position sensor output signal, wherein,
   the processing means (10) are arranged to energise the friction means (14) at variable end-stops, and
   the processing means (10) are arranged to increase the friction on the steering wheel (11) when a rotation rate of the steering wheel (11), as determined from the angle sensing means (12), is greater than a corresponding maximum rotation rate of the steering actuator (21).

2. Steer unit according to claim 1, in which a particular end-stop condition corresponds to mechanical limits of the steering actuator (21).

3. Steer unit according to claim 1, in which the processing means (10) are arranged to determine the end-stops based on at least one vehicle parameter.

4. Steer unit according to claim 3, in which the at least one parameter is one or more of the group of vehicle speed, load, load height.

5. Steer unit according to claim 1, in which the processing means (10) are arranged to gradually increase the friction on the steering wheel (11) when approaching an end-stop.

6. Steer unit according to claim 1, in which the processing means (10) are arranged to drive the friction means (14) to exert a higher friction force when the steering wheel (11) rotates in a first direction as compared to when the steering wheel (11) rotates in a direction opposite to the first direction.

7. Steer unit according to claim 1, in which the processing means (10) are arranged to adapt a ratio between the steering wheel rotation and a steered wheel rotation.

8. Steer unit according to claim 1, in which the friction means (14) engage a first part (17) of the steering wheel (11), and the steering wheel (11) comprises a flexible coupling (41) to the first part, and in which the processing means (10) are arranged to release the friction means (14) when a change of direction of the steering wheel is detected from the angular sensing means signal.

9. Steer unit according to claim 1, in which the steer unit further comprises a detection element (13) for detecting torque force on the steering wheel shaft (17), the detection element (13) being connected to the processing means (10).

10. Steer unit according to claim 1, in which the processing means (10) are arranged to reduce friction on the steering wheel shaft (17) when the detected torque force on the steering wheel (11) changes direction.

11. Steer unit according to claim 1, in which the steer unit further comprises at least one wheel torque sensor (23) detecting an external torque on the wheels (20) of the vehicle, the at least one wheel torque sensor (23) being connected to the processing means (10).

12. Steer unit according to claim 11, in which the processing means (10) are further arranged for driving the friction means (14) in dependence of the wheel torque sensor output.

13. Steer unit according to claim 1, in which the friction means (14) comprise an electrically controlled brake (15, 16).

14. Steer unit according to claim 13, in which the electromagnetic brake comprises a disc (15) attached to a shaft (17) of the steering wheel (11) and at least one electromagnetic coil (16) positioned substantially in parallel to the disc, the electromagnetic coil being connected to the processing means (10).

15. Steer unit according to claim 14, in which the disc (15) is attached to the shaft (17) of the steering wheel (11) by means of a flexible coupling.

16. Steer unit according to claim 1, in which the friction means (14) comprise mechanical blocking means (50, 51; 53).

17. Steer unit according to claim 16, in which the mechanical blocking means comprise a disc (50) attached to the steering wheel shaft (17), the disc (5) being provided with at least one saw tooth profile at its perimeter, and a blocking member (51) which is controllable by an actuator (52) between a blocking position and an idle position.

18. Steer unit according to claim 17, in which the actuator (52) comprises a sensor for sensing motion of the blocking member (51).

19. Steer unit according to claim 18, in which the mechanical blocking means comprise a disc (50) attached to the steering wheel shaft (17), the disc (50) being provided with semi-spherical indentations at its perimeter, and a blocking member (53) which is moveable between a first position in which the blocking member (53) engages the spherical indentation and a second position in which the disc (50) can rotate freely.

20. Steer unit according to claim 1, in which the friction means (14) engage a first part (17) of the steering wheel (11), and the steering wheel (11) comprises a clearance (41) to the first part, and in which the processing means (10) are arranged to release the friction means (14) when a change of direction of the steering wheel is detected from the angular sensing means signal.

21. Steer unit according to claim 1, in which the friction means (14) engage a first part (17) of the steering wheel (11), and the steering wheel (11) comprises a space for motion (41) to the first part, and in which the processing means (10) are arranged to release the friction means (14) when a change of direction of the steering wheel is detected from the angular sensing means signal.

22. Steer unit of claim 8, wherein, the flexible coupling is a steering shaft of an elastic material.

23. Steer unit of claim 8, wherein, the flexible coupling comprises elastic elements.

* * * * *